(12) United States Patent
McGee (10) Patent No.: US 6,240,333 B1
(45) Date of Patent: May 29, 2001

(54) METHOD AND SYSTEM FOR FABRICATION OF COMPOSITE PARTS

(75) Inventor: Mark G. McGee, Fort Worth, TX (US)

(73) Assignee: Lockheed Martin Corporation, Fort Worth, TX (US)

( * ) Notice: Subject to any disclaimer, the term of this patent is extended or adjusted under 35 U.S.C. 154(b) by 0 days.

(21) Appl. No.: 09/100,670

(22) Filed: Jun. 19, 1998

(51) Int. Cl.[7] .................................................. G06F 19/00
(52) U.S. Cl. .................... 700/207; 700/300; 700/404; 205/918
(58) Field of Search ..................................... 700/207, 300, 700/304, 160, 434; 165/173, 177, 183, 906; 257/712; 361/704, 707, 709; 205/918

(56) References Cited

U.S. PATENT DOCUMENTS

| | | | |
|---|---|---|---|
| 3,576,540 | * | 4/1971 | Jolliffe .................................. 250/292 |
| 4,905,556 | * | 3/1990 | Haack et al. .......................... 83/639.5 |
| 5,485,390 | * | 1/1996 | LeClair et al. ................... 364/474.24 |
| 5,731,015 | * | 3/1998 | Bartilucci et al. ..................... 425/384 |
| 5,933,353 | * | 8/1999 | Abriam et al. . |

* cited by examiner

*Primary Examiner*—Ayaz Sheikh
*Assistant Examiner*—Firmin Backer
(74) *Attorney, Agent, or Firm*—Baker Botts L.L.P.

(57) ABSTRACT

A method and system for fabrication of composite parts with tools determines a layout pattern within an autoclave based upon the heating variance of the autoclave and the thermal performance of each selected tool. The layout pattern can provide for production goals such as minimizing processing time for a given selection of tools in an autoclave. The layout pattern is displayed with an easy to use graphical user interface or through a printout that allows an autoclave operator to quickly and efficiently determine an optimal loading pattern and load an autoclave accordingly.

22 Claims, 6 Drawing Sheets

METHOD AND SYSTEM FOR FABRICATION OF COMPOSITE PARTS

TECHNICAL FIELD OF THE INVENTION

This invention relates in general to the field of fabrication of composite parts, and more particularly to an improved method and system for processing composite parts in an autoclave.

BACKGROUND OF THE INVENTION

Composite materials have a wide variety of commercial and industrial uses, ranging from aircraft and automobile to computer parts. Composite materials have many advantages which make them attractive to different industries. For instance, composite materials can reduce heat transfer, resist conduction of electricity, limit reflection of radar waves, are flexible but strong, and can be fairly easily formed into complex shapes during manufacturing. Some examples of commercial applications include the complex shapes of certain automobiles, airplanes, and boats which would be difficult to form with metal materials. Another important use of composite materials is the creation of stealth aircraft which minimize their radar cross section through the use of radar absorbing composite materials that form the majority of the aircraft's structure.

One example of an aircraft made largely from composite materials is the F-22 Raptor, the world's premier tactical aircraft, designed and manufactured by Lockheed Martin Tactical Aircraft Systems. The Raptor's composite parts are formed with flexible graphite fibers, called a ply, that are impregnated with epoxy or BMI resins which harden when subjected to the application of heat. The uncured plies are placed on tools, each tool corresponding to a composite part of the Raptor. Thus, when the graphite resin mixture hardens over the tool, the composite part is formed with the proper shape.

A number of production techniques are available for forming composite parts. Again, using the Raptor as an example, once the plies are placed over the tool, a vacuum bag is used to hold the plies securely to the tool during curing of the resin. The vacuum bag forces the material to the tool and prevents the formation of bubbles and other material deformities. The tools are then placed in an autoclave for heating. An autoclave is essentially a large oven with the ability to precisely control the thermal energy applied to tools during curing of composite parts. An autoclave operator can monitor and control the amount of thermal energy applied to the tools to maintain a predetermined heating rate of the composite parts. For instance, one typical resin will cure into the strongest possible material if the resin is heated from room temperature to just over 350° F. at a heating rate of between 1° F. per minute and 5° F. per minute. Variations from this heating schedule could result in defective parts.

The autoclaves used for curing of aircraft composite parts are necessarily large in order to accept large parts, and in order to mass produce a large number of parts. For instance, a typical autoclave is 50 feet long and has a heating container large enough to accept a forklift driven into it. The autoclave distributes thermal energy through the heating container by blowing heated air with a large fan located at one end of the heating container.

An autoclave operator must carefully distribute tools in the autoclave heating container in order to ensure that heating rate specifications are met, especially when larger autoclaves are used to produce parts of varied sizes and materials. The operator must ensure that only compatible materials are processed in each autoclave production run. Once the tools are placed in the autoclave, the autoclave operator generally must monitor the temperature and heating rate of the tools to compensate for variances in the thermal energy introduced by the autoclave, interference between tools caused by uneven airflow, and other difficulties. Operator intervention can ensure that the tools are heated within the proper specifications; however, all of this can be time consuming tasks for an autoclave operator. Further, when an autoclave operator attempts to compensate for uneven heating relating to variations in the distribution of thermal energy throughout the autoclave heating container, inefficiencies can be introduced to the production process. For instance, if an autoclave operator adjusts heating rates to a lower level in order to avoid over-heating of a part, the autoclave will require a greater amount of time to cure other parts, increasing the time required for the entire production run. Finally, if the parts are distributed improperly, the autoclave operator may have to violate the heating rate specifications for some of the tools, thus wasting the parts on those tools, in order to obtain useful parts from other tools.

SUMMARY OF THE INVENTION

Therefore, a need has arisen for a method and system for fabrication of composite parts which increases the efficiency of production equipment to allow greater throughput of high quality parts with minimal wasted materials.

In accordance with the present invention, a method and system for fabricating composite parts is provided that substantially eliminates or reduces disadvantages and problems associated with previously used methods for producing composite parts.

The method includes the steps of selecting plural tools, each tool associated with one of plural parts selected for fabrication, and each tool having a thermal performance. A layout pattern for the tools in an autoclave heating container is determined so as to provide a minimum autoclave processing time for fabrication of the plural parts, with the minimum processing time determined by using the thermal performances of the tools. The layout pattern can then be displayed for use by an autoclave operator.

More specifically, the method and system of the present invention allow an autoclave operator to achieve efficient and user-friendly production of predetermined composite parts. The autoclave operator may receive an order or schedule for production of specific predetermined parts in an autoclave run, or may select predetermined parts as a subset of an order. The autoclave operator can select a tool for each predetermined part as needed. Once the autoclave operator has selected tools for the desired parts, he can input these tool selections into a computer system to obtain a layout pattern for maximizing the efficiency of the production process by minimizing the time needed for processing in the autoclave.

The computer system provides an easy-to-use graphical user interface for accepting inputs from the autoclave operator and displaying the tool layout pattern. One window on the graphical user interface displays a tool library which can include all of the tools available for selection by the autoclave operator. The tool library window interacts with a tool library which stores data relevant to each tool, such as the thermal performance of the tool. The computer system also includes an autoclave library for storing thermal characteristics of the autoclave available to the autoclave operator. The graphical user interface accepts tool selections from the autoclave user, such as the tool selections corresponding to the predetermined composite parts for fabrication, and provides the tool selections to a layout engine. The layout engine determines a layout pattern by using the tool selections, the thermal performances associated with each tool selected and the thermal performance of the selected autoclave to determine a layout pattern for the selected tools. The layout engine provides the layout pattern to the graphical user interface for display to the autoclave operator, who can then load the autoclave and process the desired composite parts.

The layout pattern provided by the layout engine can optimize production for a given autoclave and a given set of tools based on a number of production goals. One important production goal is to minimize autoclave processing time for a given set of tools. Another important production goal is to reduce waste of production space and materials by insuring that the parts included in a particular autoclave production run will cure within the desired specifications. The layout engine can achieve these production goals by selecting an optimal layout of the selected tools in the autoclave heating container which will account for heating variances in the autoclave, thermal interference between tools, and the uniformity of airflow around the tools within the autoclave. The layout pattern can be determined with predicted thermal performances, or thermal performances of tools measured by testing. To obtain a uniformly responding load, the layout pattern can place tools that heat up slowly in high heating regions of the autoclave, and can place tools that heat up quickly in low heating regions of the autoclave heating container. The thermal performances of the tools can be stored in a tool thermal performance database associated with the tool library, and each thermal performance can include heat-up and cool-down thermal responses.

In one embodiment, the graphical user interface can allow an autoclave operator to interact with the layout pattern to rearrange the tools depicted by the layout pattern. For instance, after the layout engine determines a layout pattern and displays the layout pattern with the graphical user interface, the autoclave user can use a mouse to click and drag tools to new positions in a modified layout pattern. An autoclave operator may wish to modify the layout pattern to provide for easier loading of the autoclave. A modification engine associated with the computer system can support the display of the modified layout pattern.

The present invention provides important technical advantages for the production of composite parts. For instance, the present invention allows the production of composite parts from a given selection of tools in a minimum amount of time. This increases throughput by allowing for more autoclave production runs with the resulting savings in production costs.

Another important technical advantage of the present invention is the reduced waste of products and materials during production of composite parts by ensuring that a given set of tools can be produced within specifications before production begins.

Another important technical advantage of the present invention is the easy-to-use layout pattern. An autoclave operator can use this pattern to quickly and accurately load an autoclave with minimal training. Further, the layout pattern can be printed to provide a permanent record of the autoclave layout.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Preferred embodiments of the present invention are illustrated in the FIGUREs, like numerals being used to refer to like and corresponding parts of the various drawings.

Figure 1:
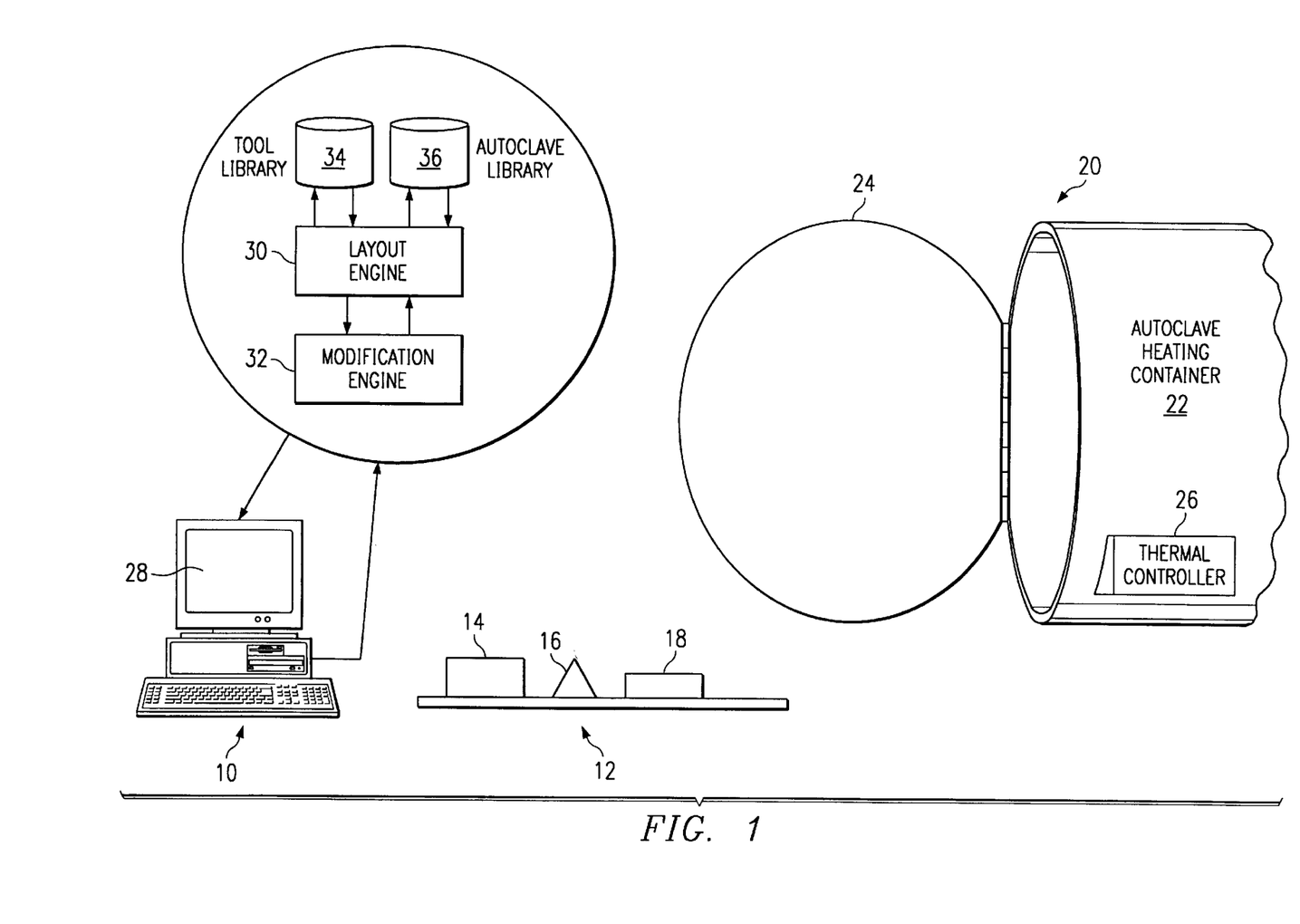
FIG. 1 depicts a schematic overview drawing of a computer system for determining a layout pattern.

Referring now to FIG. 1, a schematic overview drawing depicts the relationship of a computer system 10 for loading a project plate 12 with a first tool 14, second tool 16, and third tool 18 into an autoclave 20. Autoclave 20 has an autoclave heating container 22 large enough to hold tools placed on project plate 12. An autoclave door 24 can isolate autoclave heating container 22 to form a thermally insulated region. A thermal controller 26 associated with autoclave 20 can vary the amount of thermal energy provided to autoclave heating container 22 as needed to heat tools 14, 16 and 18 according to predetermined curing specifications.

Computer system 10 includes a graphical user interface 28 for accepting inputs from a user, such as an autoclave operator, and for displaying layout patterns for tools selected by the user. Graphical user interface 28 is in communication with a layout engine 30 and a modification engine 32. Layout engine 30 accepts tool selections from graphical user interface 28 and retrieves data associated with the tool selections from tool library 34. Layout engine 30 can also accept an autoclave selection and can retrieve specific data about a selected autoclave from an autoclave library 36. When commanded through graphical user interface 28, layout engine 30 can determine a layout pattern for selected tools in accordance with production goals, and then can provide the layout pattern to graphical user interface 28 for display to the user. Modification engine 32 can communicate with layout engine 30 and graphical user interface 28 to modify the layout pattern determined by layout engine 30 according to inputs received from a user through graphical user interface 28.

Figure 2A:
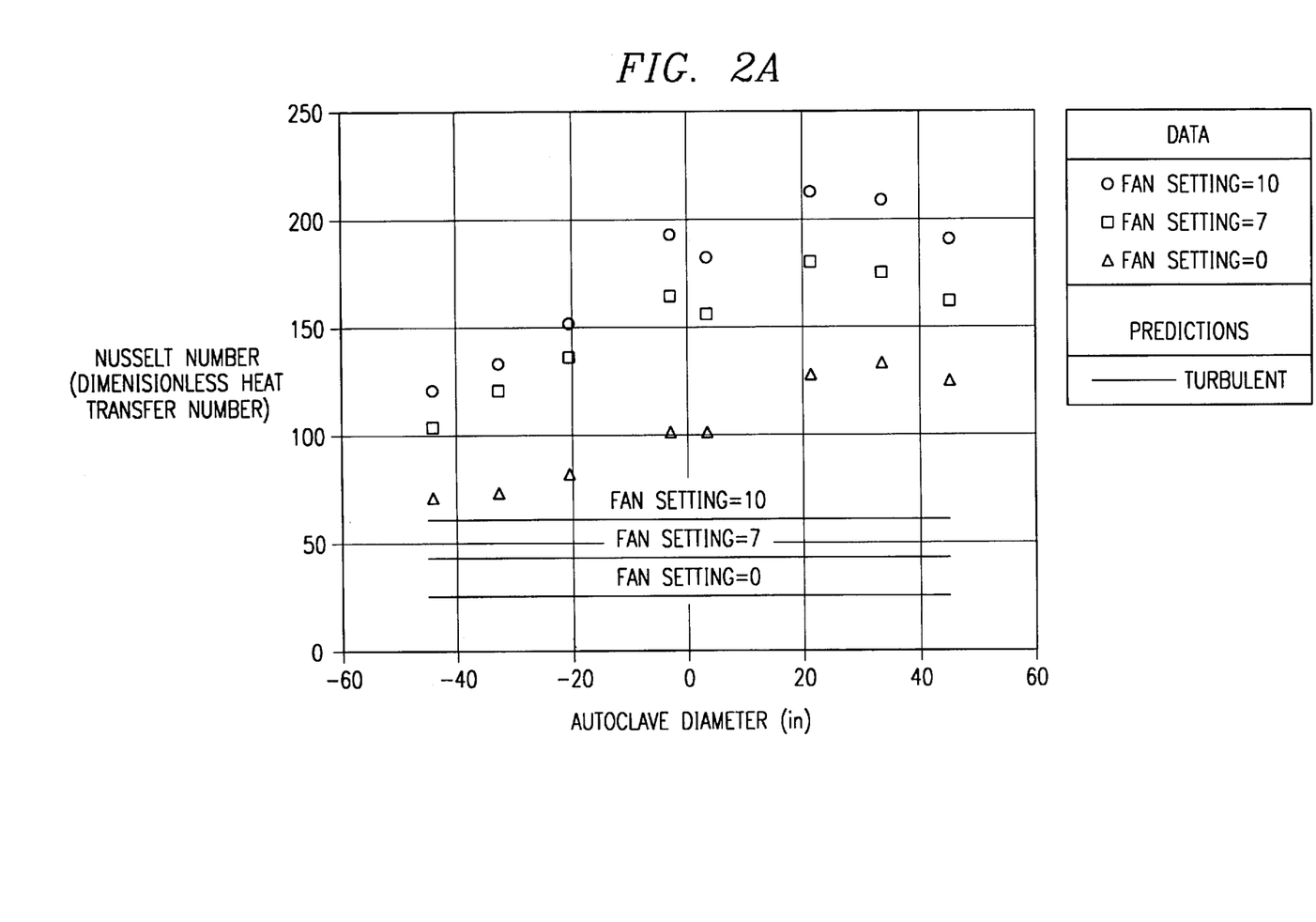
FIG. 2a depicts variances in heat transfer distributions across an autoclave having a 15 foot diameter.

Referring now to FIG. 2a, an autoclave heat transfer distribution graph is depicted which shows the distribution of heat across an autoclave having a 15 foot diameter. The left vertical axis of the graph displays the Nusselt number for dimensionless heat transfer and the bottom horizontal axis shows the diameter of the autoclave from a centerline marked as 0. The three horizontal lines marked with fan settings of 0, 7 and 10 show the predicted dimensionless heat transfer number for each fan setting. The triangles, squares and circles show the actual measured Nusselt number for each indicated fan setting at various locations across the diameter of the autoclave. In the autoclave in which these measurements were taken, a heating variance occurs across the diameter of the autoclave. Tools placed to the left of the centerline of the autoclave will be subjected to lower amounts of thermal energy than tools placed to the right of the centerline. Similar variances also exist down the length of most autoclaves.

Each autoclave can be mapped to determine its heat transfer distributions along its length. The resulting data can be stored in an autoclave library database for access by computer system 10. Computer system 10 can label regions within the autoclave heating container as high heating regions and low heating regions and can include data indicating the variance of each region from a standard. The mapping of heating variances can then be used by layout engine 30 to distribute tools in the layout pattern according to each tool's response to thermal energy. For instance, slow responding tools can be placed in regions of high heating and fast responding tools can be placed in regions of low heating.

Figure 2B:
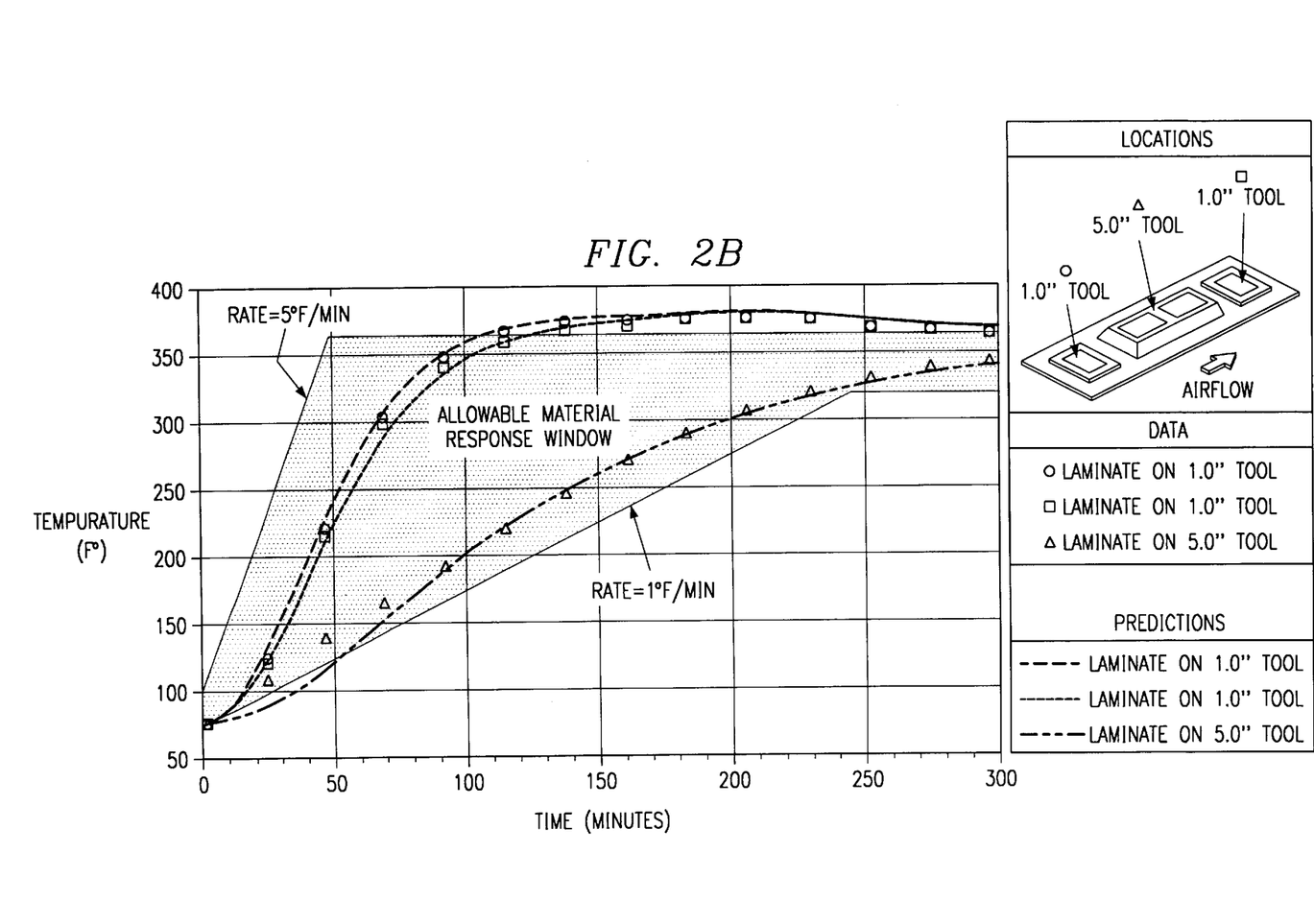
FIG. 2b depicts thermal performances for three tools relative to an allowable material response window.

Referring now to FIG. 2b, a graph depicts the thermal response of three tools aligned in an autoclave along an axis parallel to the flow of air in the autoclave. The left vertical axis indicates the temperature of each tool in degrees Fahrenheit. The bottom horizontal axis indicates the temperature of the tool in minute time intervals. The shaded central area of the graph indicates an allowable material response window with a lower boundary occurring at a heating rate of 1° F. per minute and an upper boundary occurring at a heating rate of 5° F. per minute. Although the graph depicted in FIG. 2b indicates the heat-up response of each tool, a similar cool-down response can be computed when the thermal energy within the autoclave is reduced. The triangular data points indicate the temperature of a 5 inch tool placed between first and second 1 inch tools. The line proximate to the triangles shows the predicted thermal response of the 5" tool. The circle data points indicate the temperature of a 1" thick tool located first along the axis of the airflow. The square data points indicate the temperature of a 1" tool located last along the axis of the air flow. The dash lines associated with the circle data points and square data points indicate the predicted temperature of each tool.

FIG. 2b provides exemplary data to explain the need for arranging tools within the autoclave heating container according to each tool's thermal performance. Each tool's thermal performance will vary based upon the tool's mass. Further, each tool will affect the temperature of physically proximate tools based upon the spacing of the tools relative to each other and heating variances within the heating container. FIG. 2b illustrates that, under some arrangements, different types of tools cannot be used together in the autoclave. FIG. 2b also illustrates that the heating rate for certain thermally responsive tools can cause increased processing time for tools simultaneously processed with the responsive heating tool. For instance, the 5 inch tool will heat quicker with additional thermal energy; however, in the configuration depicted in FIG. 2b, the one inch tools will heat at too-great of a rate with additional thermal energy. Thus, the presence of the five inch tool proximate to the one inch tools can result in increased processing time for the one inch tools.

Figure 3:
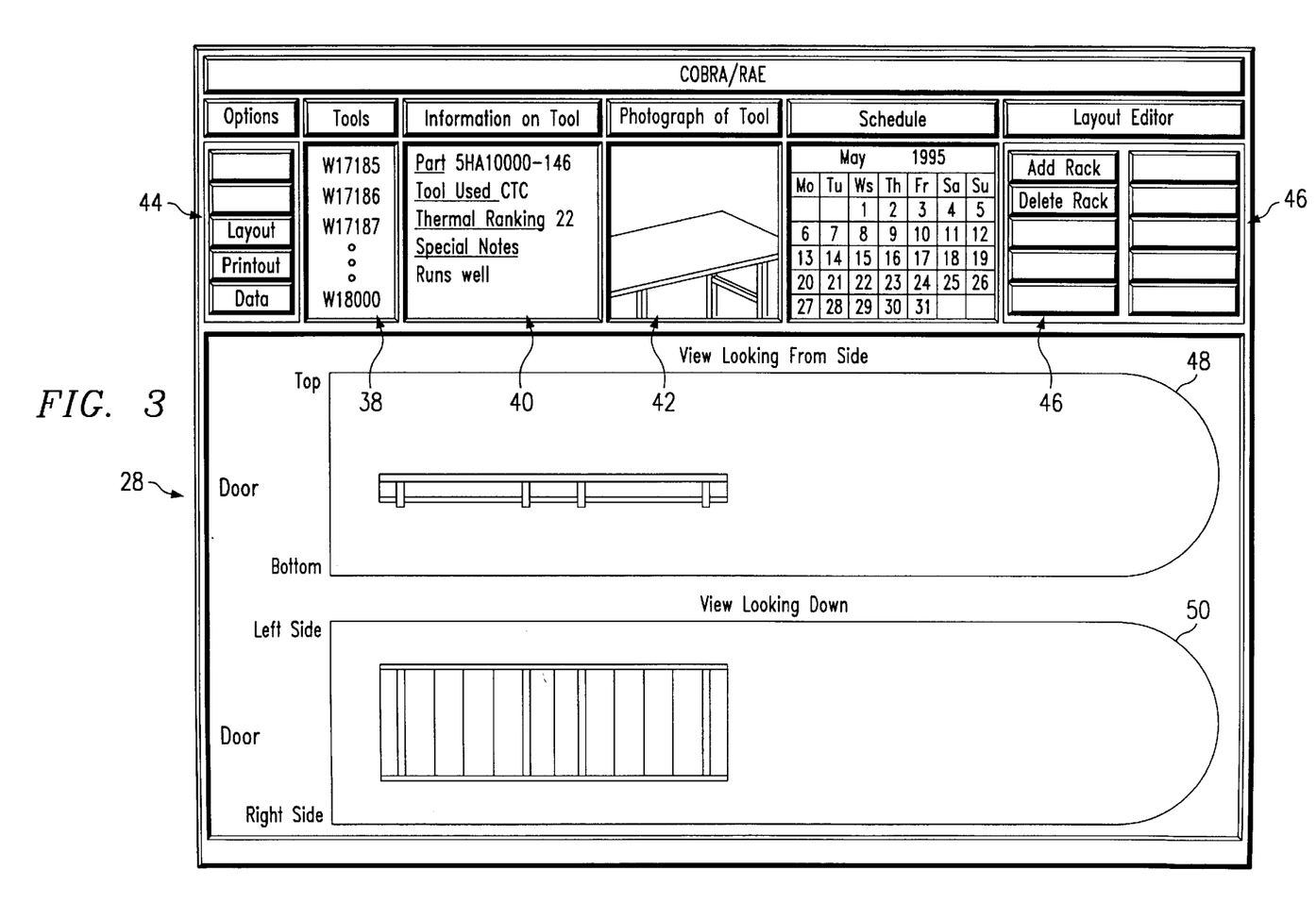
FIG. 3 depicts a graphical user interface for accepting tool selections and displaying a tool layout pattern.

Referring now to FIG. 3, one embodiment of a graphical user interface 28 is depicted. A tool library window 38 lists the tools available for the autoclave run. Each tool associated with a predetermined composite part can be selected by pointing and clicking on its name. A tool information window 40 can display information stored in the tool library 34 for each selected tool, such as the part number, the tool type, the thermal ranking, and any special notes for that tool. A tool photograph window 42 can show an actual image of the tool to avoid incorrect identifications by an autoclave operator. An options window 44 can allow a user to choose a layout option or a printout option. An editor window 46 allows a user to add and delete project plates. A side-looking view 48 and a down-looking view 50 project layouts in an easy to understand three-dimensional manner.

Figure 4A:
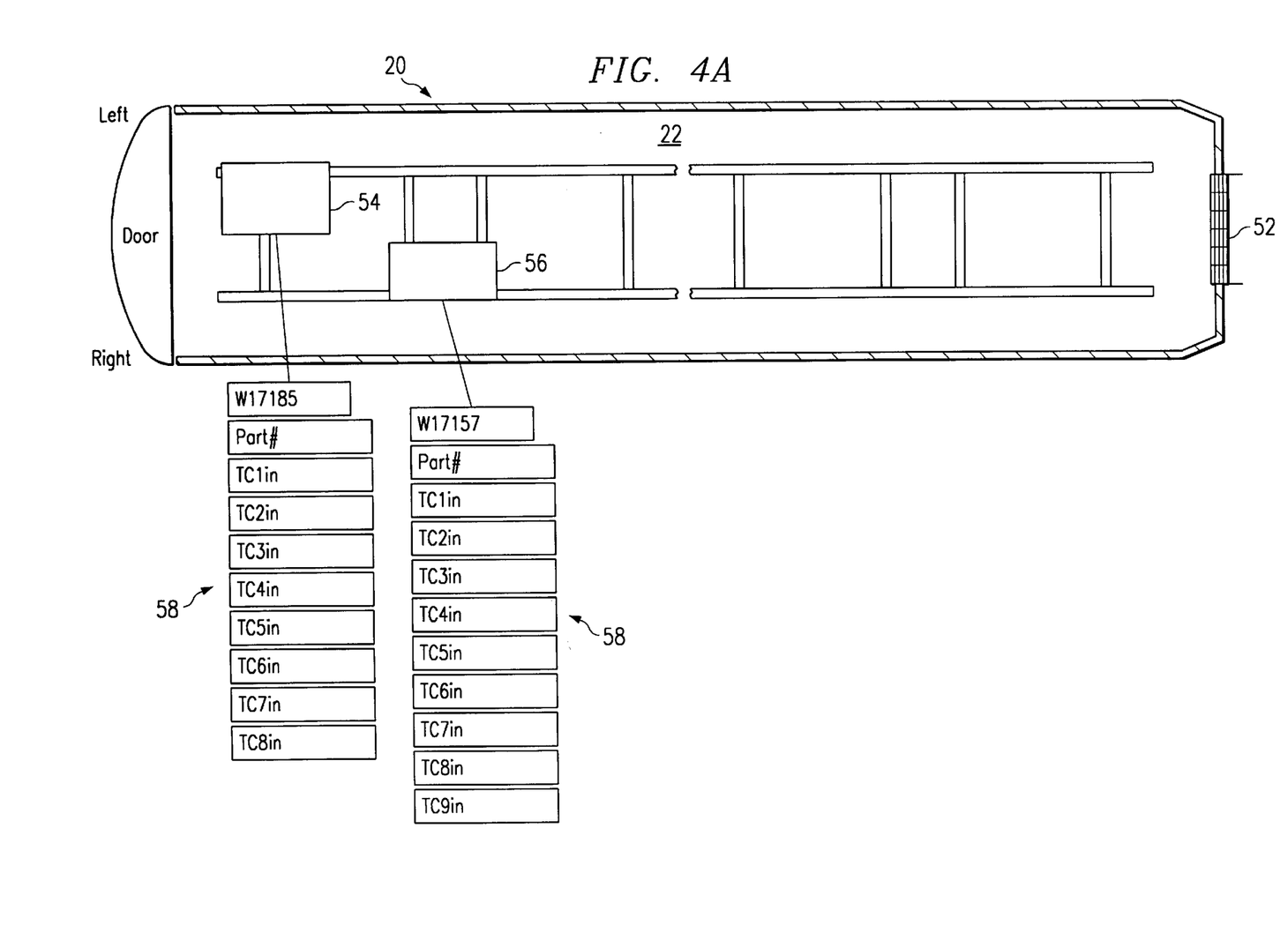
FIG. 4a depicts a layout pattern for a first and second tool with each tool's corresponding thermocouple records.
Figure 4B:
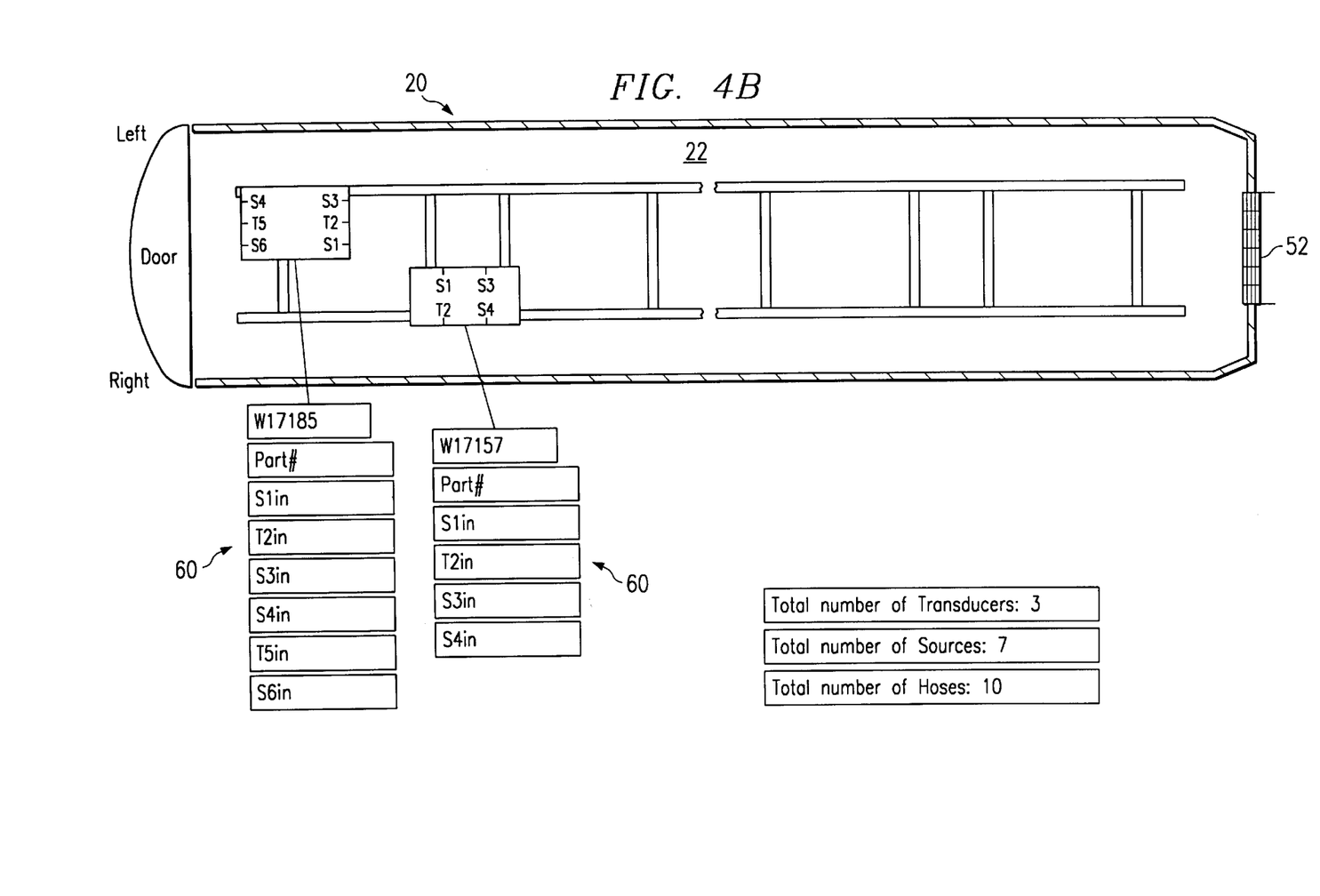
FIG. 4b depicts a layout pattern for a first and second tool with vacuum source and vacuum transducer records.

FIG. 3 depicts graphical user interface 28 prior to the selection of tools and the determination of a layout pattern. FIGS. 4a and 4b depict layout patterns for a first and second selected tool and also include other information which can enhance the utility of the graphical user interface. Referring to FIG. 4a, autoclave 20 is depicted in a down-looking view with a fan 52 for providing heated or cooled air as needed to heat or cool tools in autoclave heating container 22. A first tool 54 identified by the label W17185, and a second tool 56 identified by the label W17157, are used to show an example of a layout pattern which can be determined by layout engine 30. An autoclave operator can use this layout pattern to precisely locate the tools within the autoclave. In addition, the autoclave operator can print out the down looking view of FIG. 4a to make thermocouple window 58 available in a hard copy. Thermocouples are connected to each tool to take temperature readings as the tool is heated or cooled and to provide the temperature readings to the thermal controller for monitoring and adjustment of the thermal energy provided to heating container 22 as is needed for each tool. Thermocouple window 58 allows the autoclave operator to maintain a written record of where each tool's thermocouple is attached to the appropriate jack or plug-in located in autoclave 20.

FIG. 4b depicts additional useful information available for the parts W17185 and W17157. Each S indicated on each tool shows the location of a source hose for providing a vacuum to the tool. Each T located on each tool indicates the hookup location for a transducer hose for measuring the vacuum of each tool. A vacuum window 60 allows the autoclave operator to track each connection as appropriate and helps eliminate errors which could be caused by connecting source hoses and transducer hoses to incorrect jacks. An autoclave operator can use the jack information, both from the thermocouple window 58 and the vacuum window 60, to monitor temperature responses during curing and to allow a printout of these temperature responses to form a permanent record if needed.

In operation, the graphical user interface of the present invention provides a user-friendly method and system for increased efficiency of the use of autoclaves. Software for operating the present invention was written with Microsoft's Visual Basic software and data for use by the program can be stored and tracked with a Microsoft Excel database. The software can be run on a personal computer. An autoclave operator calls up graphical user interface 28 and identifies tools from a scrollable list depicted by tool library window 38 based upon the parts which the operator desires to fabricate. For example, the scrollable list of tools could include all of the tools used for the production of the Raptor.

Once the autoclave operator has selected the tools for fabrication of the desired parts, the operator can request a layout by clicking on the layout option. Graphical user interface 28 communicates the tool selections to layout engine 30. Layout engine 30 can perform an error check to ensure that the tools selected by the operator are compatible. For instance, layout engine 30 can ensure that the autoclave operator has not selected material types with different processing specifications that cannot be processed simultaneously. Layout engine 30 can then determine a layout pattern for the tools inside the autoclave, and can provide a graphical user interface display such as are depicted in FIGS. 4a and 4b. The layout pattern can be determined based on measured or predicted tool thermal performance stored in a database such as tool library 34. The known variance in autoclave heating is taken into account to lay out slow responding tools in regions of high heating and fast responding tools in regions of low heating. Further, the layout engine can determine the layout pattern to minimize thermal interference, such as by spacing the tools to achieve a uniform airflow. The layout pattern can provide for specific production goals such as a layout pattern that will produce a thermal response of the tools that minimizes autoclave processing time. Layout engine 30 can take into account heat-up and cool-down thermal responses and other factors to even out the thermal response of the tools during autoclave processing. Layout engine 30 can also consider the spacing between tools within the autoclave to maintain a uniform airflow around the parts, thus minimizing thermal interference between tools.

An optimal thermal loading pattern may arrange tools in a manner that would be awkward for the autoclave operator to load into the autoclave. Modification engine 32 supports the rearranging of the layout pattern into a modified pattern by clicking on tools and moving the tools to a new position in a mouse-driven click-and-drag operation. This enhances the flexibility of the system for the user without significantly sacrificing control of the production process.

Once the layout pattern is finalized, the autoclave operator can send a copy of the layout pattern to a local printer. The autoclave operator can use the printout to place the tools onto project plates for loading into the autoclave. The autoclave operator can use the thermocouple window and vacuum windows and the transducer and vacuum hose locations indicated on the printouts to aid in the connection of the proper transducers, vacuum sources and thermocouples to each tool as needed. The autoclave operator can keep a written record of each tool, thermocouple, source and transducer hookup by associating each wall jack for each hookup to printouts provided by the autoclave. Thus, the autoclave operator can monitor each tool's performance during processing of parts and can maintain a permanent written record for each part as needed.

An autoclave library 36 can allow the layout engine to predict layout patterns for different types and sizes of autoclaves. The autoclave library can maintain heating data for each independent autoclave based on measured or estimated values. In one embodiment, an autoclave user can interact with autoclave library 36 and tool library 34 to modify heating variance data based on actual autoclave results and observations.

Although the present invention has been described in detail, it should be understood that various changes, substitutions and alterations can be made hereto without departing from the spirit and scope of the invention as defined by the appended claims.

What is claimed is:

1. A system for fabrication of plural composite parts, the system comprising:
   plural tools for fabrication of the plural composite parts, each tool having a thermal performance;
   an autoclave having a thermal characteristic and comprising an autoclave heating container for holding the tools during the fabrication of the parts, the autoclave further having a thermal controller for controlling thermal energy applied to the autoclave heating container; and
   a computer for determining a layout pattern for fabrication of predetermined composite parts in the autoclave, the computer comprising:
   a tool library for storing thermal performances of tools for the fabrication of composite parts;
   an autoclave library for storing thermal characteristics of at least one autoclave;
   a graphical user interface for displaying tools stored in the tool library to an autoclave user, and for accepting tool selections from the autoclave user, the tool selections corresponding to a selection of composite parts; and
   a layout engine determining a layout pattern in a selected autoclave for the tool selections, the thermal performances of tools associated with the tool selections and the selected autoclave thermal characteristics to determine a layout pattern for the selected tools in the autoclave heating container, the layout engine further generating the layout pattern on the graphical user interface.

2. The system according to claim 1 wherein the layout engine determines a layout pattern providing a minimum autoclave processing time.

3. The system according to claim 1 wherein the layout engine determines a layout pattern providing minimum thermal interference between tools.

4. The system according to claim 1 wherein the layout engine determines a layout pattern providing uniform airflow around the tools in the autoclave container.

5. The system according to claim 2 wherein the thermal performances of the tools comprise predicted or measured thermal performances.

6. The system according to claim 2 wherein the computer further comprises a modification engine for rearranging the layout pattern displayed on the graphical user interface to a modified layout pattern.

7. A method for fabrication of a plurality of parts simultaneously in an autoclave, comprising:
   creating a library of a plurality of tools for fabrication of parts in the autoclave;
   storing a thermal performance of the plurality of tools in a thermal performance database;
   storing the thermal characteristics of the autoclave;
   selecting tools from the library for fabrication of parts in the autoclave; and
   determining a layout pattern for the selection of tools, the thermal performance of the selected tools and the thermal performance of the autoclave.

8. The method according to claim 7 wherein the layout pattern produced a thermal response of the selected tools that minimizes autoclave processing time.

9. The method according to claim 7 wherein the thermal performances comprise heat-up and cool-down thermal responses.

10. The method according to claim 7 further comprising: altering the layout pattern to a modified layout pattern.

11. The method according to claim 10 further comprising displaying the layout pattern with a graphical user interface, and wherein altering the layout pattern further comprises altering the layout pattern of at least one tool to a new position.

12. The method according to claim 7 further comprising printing the layout pattern.

13. A method for fabrication of a plurality of parts simultaneously in an autoclave, comprising:
   creating a library of a plurality of tools for fabrication of parts in the autoclave;
   storing the thermal performance of the plurality of tools in a thermal performance database;

storing in a library database a heat distribution map of an autoclave heating container;

selecting tools from the library of available tools for fabrication of desired parts in the autoclave heating container; and communicating the tool selection to a layout engine for determining a layout pattern based on the selection of tools, the thermal performance of the selected tools and the heat distribution map of the autoclave heating container, the determined layout pattern minimizing thermal interference in the autoclave heating container.

14. The method according to claim 13 wherein the thermal performances of the selected tools comprises thermal response of the tools during heat-up and during cool-down.

15. The method according to claim 14 wherein determining a layout pattern further comprises determining a layout pattern for the tools in the autoclave heating container to provide a uniform airflow in the autoclave heating container during fabrication of the parts.

16. The method according to claim 15 wherein determining a layout pattern further comprises determining a layout pattern for the tools in the autoclave heating container to provide minimal thermal interference between tools.

17. The method according to claim 14, further comprising displaying the layout pattern with a graphical user interface.

18. The method according to claim 17 further comprising rearranging the layout pattern with the graphical user interface.

19. The method of claim 13 wherein the stored heat distribution map comprises high heat regions, low heat regions, and variance of each region from a standard.

20. The method of claim 13 wherein the library of a plurality of tools comprises identification of each tool by tool type, by part number, and by thermal ranking.

21. The method according to claim 20 when selecting tools from the tool library of available tools comprises selecting a tool based on tool type, part number, and thermal ranking.

22. The method according to claim 13 further comprising rearranging the layout pattern to determine a modified pattern by operation of a modification engine.

* * * * *